US010730655B2

(12) United States Patent
Grabher

(10) Patent No.: US 10,730,655 B2
(45) Date of Patent: Aug. 4, 2020

(54) CONTAINER COMPRISING A SUPPORT RING

(71) Applicant: ALPLA WERKE ALWIN LEHNER GMBH & CO. KG, Hard (AT)

(72) Inventor: Markus Grabher, Lustenau (AT)

(73) Assignee: ALPLA WERKE ALWIN LEHNER GMBH & CO. KG (AT)

(*) Notice: Subject to any disclaimer, the term of this patent is extended or adjusted under 35 U.S.C. 154(b) by 0 days.

(21) Appl. No.: 15/523,650

(22) PCT Filed: Oct. 30, 2015

(86) PCT No.: PCT/EP2015/075264
§ 371 (c)(1),
(2) Date: May 1, 2017

(87) PCT Pub. No.: WO2016/066807
PCT Pub. Date: May 6, 2016

(65) Prior Publication Data
US 2017/0305590 A1 Oct. 26, 2017

(30) Foreign Application Priority Data

Oct. 30, 2014 (CH) .................................... 1667/14

(51) Int. Cl.
B65D 1/02 (2006.01)
B29C 49/04 (2006.01)
B29C 49/00 (2006.01)
B29C 48/00 (2019.01)
B29K 23/00 (2006.01)
B29L 1/00 (2006.01)
B29L 31/00 (2006.01)

(52) U.S. Cl.
CPC ........ *B65D 1/0246* (2013.01); *B29C 49/0073* (2013.01); *B29C 49/04* (2013.01); *B65D 1/023* (2013.01); *B29C 48/0017* (2019.02); *B29C 48/0018* (2019.02); *B29K 2023/065* (2013.01); *B29K 2023/12* (2013.01); *B29L 2001/00* (2013.01); *B29L 2031/7158* (2013.01)

(58) Field of Classification Search
CPC .. B65D 1/00–0246; B29C 49/00–0073; B29K 2023/065; B29K 2023/00–12; B29L 2001/00; B29L 2031/7158
USPC ...................................................... 215/40–55
See application file for complete search history.

(56) References Cited

U.S. PATENT DOCUMENTS 3,902,621 A * 9/1975 Hidding ............. B65D 41/0414
206/807
3,940,001 A * 2/1976 Haefner .................. B29C 49/22
215/12.2

(Continued)

FOREIGN PATENT DOCUMENTS

FR 2937309 4/2010

*Primary Examiner* — Kareen K Thomas
(74) *Attorney, Agent, or Firm* — Morriss O'Bryant Compagni Cannon, PLLC

(57) ABSTRACT

The invention relates to a blow-molded container comprising a body and a neck, the neck being provided with an outlet and a blow-molded support ring. The support ring has recesses along its entire height that extends substantially in the longitudinal direction of the neck; said recesses extend from the edge of the support ring in the direction of the neck, across the entire width of the support ring, all the way to the neck.

23 Claims, 1 Drawing Sheet

(56) References Cited

U.S. PATENT DOCUMENTS

| | | | | |
|---|---|---|---|---|
| 4,708,255 A | * | 11/1987 | Thompson | B65D 41/0428 |
| | | | | 215/329 |
| 8,046,974 B2 | * | 11/2011 | Lewis | B65D 41/18 |
| | | | | 215/330 |
| 8,308,005 B2 | * | 11/2012 | Penny | B65D 1/0246 |
| | | | | 215/252 |
| 2003/0057176 A1 | * | 3/2003 | Kitterman | B65B 7/168 |
| | | | | 215/351 |
| 2004/0159626 A1 | * | 8/2004 | Trude | B65D 1/0276 |
| | | | | 215/373 |
| 2007/0087075 A1 | | 4/2007 | Janeczek | |
| 2012/0118849 A1 | | 5/2012 | Harper | |

* cited by examiner

CONTAINER COMPRISING A SUPPORT RING

CROSS REFERENCE TO RELATED APPLICATIONS

This application is a national phase entry under 35 U.S.C. § 371 of PCT/EP2015/075264 filed on Oct. 30, 2015, which claims priority to Swiss Patent Application No. 1667/14 filed on Oct. 30, 2014, the entirety of each of which is incorporated by this reference.

TECHNICAL FIELD

The invention relates to a blow-molded container comprising a specially designed support ring.

PRIOR ART

Machine transport of containers following their production (filling, cleaning and preparation for renewed filling, etc.) constitutes a challenge, especially in the case of very light plastic containers, which is why suitable conveyance means are of interest for the beverage industry in particular and therefore in conjunction with bottle-shaped containers.

It is known that bottles can be equipped with a support ring which facilitates automatic handling of the same. The support ring is a ring-shaped protrusion surrounding the neck of the bottles and connected to it; this is occasionally also referred to as a holding collar, which makes it possible to grip the means being conveyed beneath the support ring and thereby be able to transport the bottle in a suspended form.

Corresponding conveyance means are often characterized by two parallel support elements, which define the conveyance path, for example, in the form of belts or chains that are guided in parallel and on which the support ring is supported during transport at two opposing locations with respect to the container. The support elements form a transport channel between them for receiving the neck of the bottle. Alternative conveyance means may comprise U-shaped hanging elements moving along a transport path, enclosing the neck of the bottle and gripping beneath the support ring.

Support rings must thus have sufficient stability to carry the weight of the container, whether empty or full. Solid support rings, such as those encountered on bottles in most cases, ensure such stability. In the case of containers of this type produced by blow molding, the neck and the support ring are not blown.

However, it is also possible to provide that not only the container body but also the container neck, including the support ring, is produced by blow molding. In this case, the support ring is a bulge in the container wall and is therefore hollow. Support rings of this type are not as stable.

Advantages of the Invention

One advantage of the present invention is to provide a container with a blow-molded support ring that is nevertheless stable. Additional advantages and goals of the present invention are derived from the following description.

SUMMARY OF THE INVENTION

The advantages set forth above are achieved by a container according to the present invention.

The present invention discloses among other things a blow-molded container comprising a body and a neck, wherein the neck has a pour opening and a blow-molded support ring. The container is characterized in that the support ring has a recess, which extends from the edge of the support ring in the direction of the neck. The recess extends over the full height of the support ring (the height extending essentially in the direction of longitudinal extent of the neck) and/or from the top side to the bottom side of the support ring.

Features are described below, wherein these features are to be regarded (individually) as advantageous, even if they are not explicitly identified as such. The features are disclosed separately (as part of any container) and in any combination—as long as they are not mutually exclusive. This includes the possibility of simultaneous implementation of all the features described here.

The neck and the body of the container are joined to one another and are expediently designed in one piece including the support ring.

The container is made of plastic, the plastic being one of the following types of plastic, for example, or a combination of several of the following types (in particular a blend or a multilayer structure of several types): PE (polyethylene), in particular HDPE (high-density polyethylene); PP (polypropylene) or other plastics that are suitable for extrusion blow molding.

The proposed container is produced by a blow-molding method, in particular by an extrusion blow-molding method.

At any rate, the support ring and the body of the container are produced by blow molding, and this may also apply to the remainder of the neck.

If additional fastening means (e.g., a thread), which may be in the form of protrusions and/or recesses, are provided on the neck for fastening a cover on the pour opening, then these fastening means may also advantageously be produced by blow molding.

The cover may be designed to partially or completely seal the pour opening in the condition in which it is connected to the neck by the fastening means.

The support ring is usually arranged between the pour opening and the body, such as at the transition between the neck and the body of the container.

If fastening means are provided for fastening a cover, then these may be arranged between the pour opening and the support ring.

It is provided that the support ring is ring shaped at least in the sense that it surrounds and/or encloses the neck. The neck may be round or angular, for example, in the sectional view (parallel to the plane in which the support ring is located).

The support ring has a side facing the neck and/or the pour opening (top side) and an opposite side (bottom side), which faces the body of the container and is opposite the top side with respect to the support ring. The two sides are identified as the top side or the bottom side respectively for differentiation. The distance between the top side and the bottom side of the support ring is referred to as the height of the support ring.

An advantageous average height of the support ring (not counting the recesses) amounts to at least 0.5 or 1 or 1.5 millimeters and/or at most 3.5 or 3 or 2.5 millimeters.

The side of the support ring connecting the top side and the bottom side as the outer edge is referred to as the "narrow side" bracketing out the sides of the recess. Use of the terms "top side," "bottom side" and "narrow side" serves only to facilitate a differentiation.

The transitions from the narrow side to the top side and from the narrow side to the bottom side of the support ring may be rounded. An advantageous radius of the transitions amounts to 0.5 to 1 millimeter (measured on the outside).

Between the recesses, the support ring has an "outer edge" running at the maximum distance from the neck along the narrow side. The distance between the outer edge and the neck of the container is thus referred to as the width of the support ring.

It is possible to provide that the support ring has a maximum width of at least 1 or 1.5 or 2 and/or at most 5 or 4 or 3 millimeters.

The straight line running through the midpoint of the support ring and aligned at a right angle to the plane in which the support ring is situated is referred to as the "central axis."

According to one variant, the support ring is designed as a bulged shape or a bulge in the container wall and/or is hollow.

The support ring may have the shape of a protrusion on the outside of the container wall and/or of a protrusion extending away from the central axis. Then there is expediently a corresponding depression on the inside of the container wall with respect to the container wall on the opposite side. The height of the protrusion at one location corresponds to the width of the support ring at said location in this variant. If the recess extends over the total width of the support ring, i.e., up to the neck, then the protrusion and/or the depression is interrupted at the location of the recess. One might also say that one or more of such recesses subdivide the protrusion and/or the depression into a number of protrusions and/or depressions corresponding to the number of such recesses. Two neighboring protrusions or depressions may in this case be separated from one another by such a recess.

The support ring may surround the neck completely (naturally except for the recess, if it extends all the way to the neck).

According to one variant, the support ring has an essentially circular shape. The inner circle of the circular ring forms the transition to the neck while the outer circuit defines the outer edge of the support ring.

It is provided that the support ring has a recess (i.e., a gap) extending from the outer edge of the support ring in the direction of the neck. Such a recess results in a stiffening of the support ring and thus contributes to its stability.

The recess expediently extends over the entire height of the support ring. Therefore water present on the top side of the support ring, among other things, can flow off of the support ring better.

In addition, it is also possible to provide that the recess extends over at least 30%, 50% or 70% of the width of the support ring. It is especially advantageous if the recess extends over the entire width of the support ring, i.e., as far as the neck. Thus, the base of the recess can develop into the neck without a shoulder or it may merge with the neck. In this design, when at least two recesses are present, extending as far as the neck, the support ring may be formed by sectors extending transversely to the direction of longitudinal extent of the neck.

The support ring may form a cavity (for example, due to extrusion blow-molding method used to produce the container), which opens on the inside of the neck and essentially forms a slot there. If multiple recesses extend over the entire width of the support ring, i.e., as far as the neck, then the slot along the inside of the neck is subdivided by the recesses into a plurality of individual slots. At the locations where the recesses extend as far as the neck, the inside contour of the container is at least essentially flush with locations next to it in the longitudinal direction of extent of the neck. Therefore, no bulge is formed there on the inside contour of the neck.

The recess may extend over at most 30%, 15% or 10% and/or at least 3%, 5% or 8% of the circumference of the support ring and/or of the circumference of the neck.

According to one variant, the recess has sides extending in the direction of the neck. The sides of the recess may be connected to the outer edge of the support ring.

The sides of the recess may be designed to be straight and/or flat, as seen in cross section, namely running parallel to the central axis of the support ring in the cross section over a distance that may correspond to at least 20%, 30% or 50% of the height of the support ring. Alternatively, the aforementioned sides could also be referred to as essentially flat.

It is advantageous if sides of the recess extending essentially in the direction of longitudinal extent of the neck are designed to be essentially flat in at least subareas, namely over essentially the entire height of the support ring, because in this way forces acting in the direction of longitudinal extent of the neck, such as impact forces in installing closures, for example, may be absorbed.

The transitions from the sides of the recess to the top side of the support ring and from the sides of the recess to the bottom side of the support ring may be rounded. An advantageous radius of the transitions amounts to between 0.5 and approx. 2 millimeters, or between 0.5 and approx. 1 millimeter. To increase the stability with respect to axial forces, the transitions may also be designed with sharp edges, so that in the sense of this description, "sharp edges" is understood to refer to a radius between approx. 0.2 and 0.5 millimeter. These values mentioned in this paragraph are also measured on the outside.

If the sides of the recess are shaped in this way, they create reinforcement of the support ring.

The sides of the recess extending in the direction of the neck may advantageously form an angle to the neck (in particular an angle to a tangent to the neck), which is less than 60° and/or they may form an angle to one another that is greater than 60°. This shaping facilitates the production of the recess.

In addition to the recess described here, the support ring may have at least 1, 2 or 3 and/or at most 10, 8 or 7 additional recesses.

The recess and the additional recesses may be arranged at regular intervals from one another along the support ring.

The depressions may advantageously extend over a total of at most 50%, 40% or 30% of the circumference of the neck and/or of the support ring.

When reference is made to an object (e.g., a recess) in this document, this does not exclude the presence of additional objects of the same type. In other words, when an object is mentioned with "at least one" such object and "one or more" such objects are also disclosed. One, two, three or more or even all of the additional objects may optionally have the same features as the one object.

The patent claims which follow are each additionally disclosed with a reference back to any one of the preceding patent claims, even if they were not claimed in that form.

BRIEF DESCRIPTION OF THE DRAWINGS

The drawings show in a schematic representation.

EMBODIMENT OF THE INVENTION

The invention is explained below as an example with reference to the drawings.

DETAILED DESCRIPTION OF THE INVENTION

Figure 1:
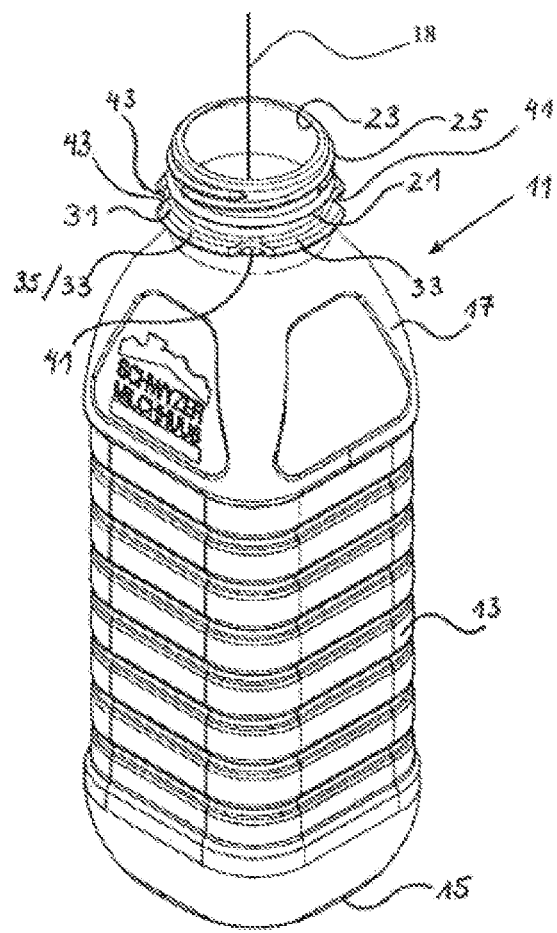
FIG. 1 a perspective view of a container.
Figure 2:
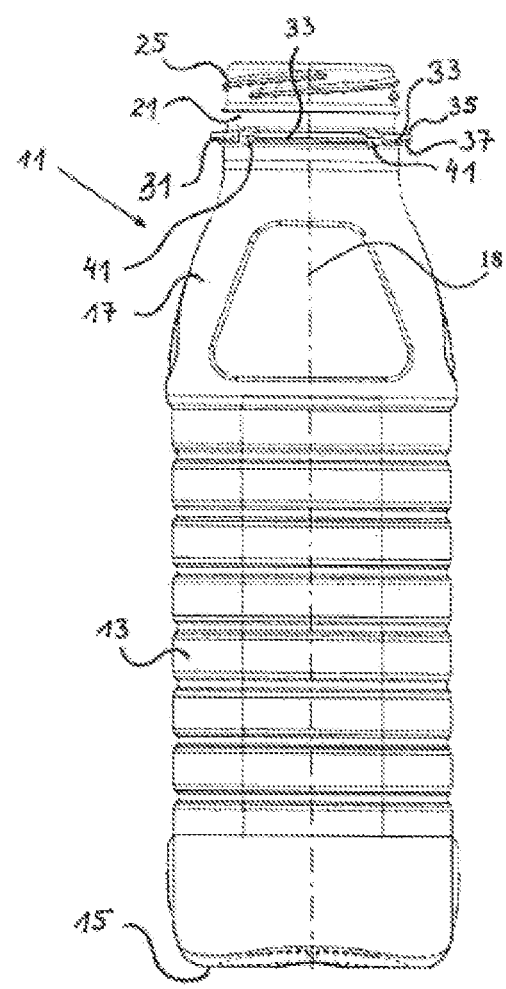
FIG. 2 a side view of the container from FIG. 1.
Figure 3:
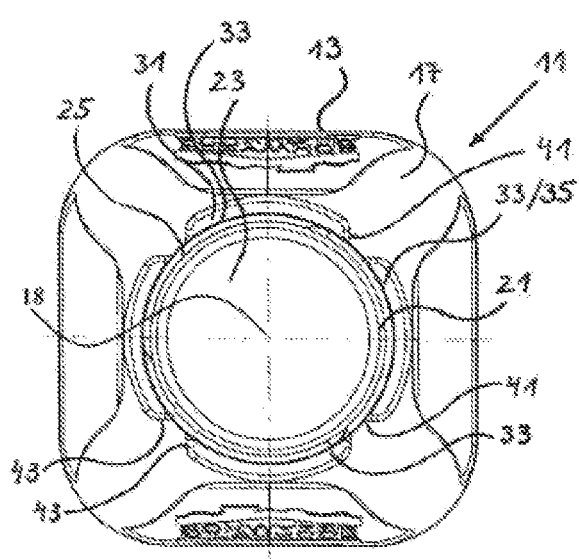
FIG. 3 a top view of a container from FIG. 1.
Figure 4:
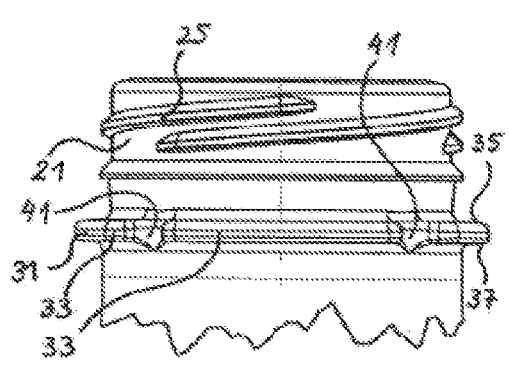
FIG. 4 a side view of the neck of the container from FIG. 1.

FIGS. 1 through 4 show a container 11 having a body 13 and a neck 21, wherein only the neck 21 is shown in FIG. 4.

The container 11, in the form of a bottle in the example shown here, is produced by a blow-molding process, in particular by extrusion blow molding. For example, it may be suitable for holding free-flowing substances, such as liquids or powders, in which case the container 11 also has a pour opening 23 for dispensing its contents to the outside.

The pour opening 23 is arranged on the neck 21 and can expediently be closed by a cover (not shown). For fastening such a cover on the pour opening 23, the neck 21 may have fastening means, for example, in the form of protrusions and/or depressions, in particular in the form of a thread 25. In this case, the cover could be equipped with the corresponding fastening means, for example, in the form of protrusions and/or depressions, which are designed to cooperate with those on the neck to create a form-fitting connection of the cover on the pour opening 23. The protrusions 25 and/or the depressions on the neck 21 may optionally also be formed by blow molding and/or as hollow bulges in the container wall.

The neck 21 is connected to the body 13, wherein to increase the capacity of the container 11 or for other reasons (aesthetics, etc.), it may be useful if the body 13 has a different cross section, in particular a larger cross section than the neck 21 (cross section transversely to the central axis 18 of the neck 21 of the container 11 in each case). In this case, the body 13 tapers toward the neck 21, wherein the tapering area of the body 13 is referred to as the shoulder 17. The body 13 may have any shape in principle, but it often has an essentially cylindrical, oval and/or rotationally symmetrical shape.

The pour opening 23 is expediently arranged opposite the bottom 15 of the container 11, wherein the bottom 15 forms a part of the body 13, which is shaped in such a way that the container 11 can be positioned in a stable manner standing on the bottom 15.

The neck 21 may have a different shape than the body 13, wherein a cylindrical shape, in particular a circular shape, facilitates the creation of the fastening means for a cover (e.g., thread 25).

The presence of a so-called support ring 31 is particularly important. The designation "support ring" indicates, on the one hand, that it is usually essentially circular, wherein it is arranged on the neck 21 and connected thereto. It surrounds the neck 21 and extends starting from the neck and moves radially outward. On the other hand, the designation is an indication of the function of the support ring. It facilitates automatic handling of the container 11, for example, the alignment, the transport or the sorting. However, the outer edge of the support ring may also be flattened instead of being circular, for example.

The container 11 can be transported on the support ring 31, wherein a transport device serving this purpose (as described in the introduction, for example) will usually have two support elements (e.g., rails or belts) arranged and/or running in parallel, contacting the container 11 on two opposing sides on the support ring 31, in particular supporting it. It is therefore desirable for the support ring 31 to have sufficient stability to be able to carry the weight of the container 11, with or without contents.

Support rings are often designed to be solid and therefore have sufficient stability. However, in the case of blow-molded containers 11, the support ring 31 may also be blow molded, which is provided according to the present invention. In this case, the support ring 31 may be designed as a bulge in the container wall that is hollow on the inside. Such blow-molded support rings have a reduced stability in comparison with solid support rings.

To increase its stability, the support ring 31 according to the variant illustrated in the figures has a plurality of recesses 41, which extend from the outer edge of the support ring 31 in the direction of the neck 21 (i.e., toward the neck) and thereby subdivide the support ring 31 into segments 33.

One segment 33 is defined and/or limited by two recesses 41 adjacent to one another on the support ring 31. The segments 33 may each take up the same amount of the circumference of the support ring 31 and/or may be of the same length as in the example shown. However, they may also be of different lengths. The same thing is also true of the recesses 41.

It is advantageous if the recesses 41 take up, on the average, a smaller amount of the circumference of the support ring 31 or have a smaller length than the segments 33. If the segments 33 are too short, the function of the support ring 31 may be impaired. It is advantageous if, in the case of two parallel tangential planes at the neck 21, both of them always intersect the support ring 31 and/or a segment 33. This ensures that the support ring 31 protrudes beyond the neck 21 on two opposite sides of the neck 21 and thus can cooperate with a transport device, for example.

The recesses 41 extend over the entire height of the support ring 31, i.e., from the top side 35 to the bottom side 37 of the support ring 31, and thereby reduce the width of the support ring 31 at the site of the recesses 41 (the width of the support ring is defined like that of a circular ring by the difference between the radius of the outer circle (R) and the radius of the inner circle (r), i.e., (R−r), the height of the support ring corresponds to its extent in the direction of the central axis 18, i.e., the axis at a right angle to the plane of the circle through the midpoints of the outer circle and the inner circle; this corresponds to the central axis of the neck 21). Among other things, this allows water to flow off the top side 35 of the support ring 31.

The recesses 41 may extend over the entire width of the support ring 31, as in the example shown here, i.e., as far as the neck 21. However, this is not absolutely necessary, i.e., the recesses could also extend over only at most 90%, 70% or 60% and/or at least 20%, 30% or 40% of the width of the support ring 31 and the width of the support ring 31 at the locations where the recesses are located, to reduce the aforementioned percentage amounts.

The sides 43 of the recesses 41 running in the direction of the neck (i.e., toward the neck 21) contribute to the stability of the support ring 31, all the more so, the shallower they are. It is therefore advantageous if the sides 43 run parallel to one another and/or at an angle between 80 and 100° to the top side and/or to the bottom side of the support ring 31 in a direction parallel to the central axis 18 over at least 20%, 30% or 50% of the height of the support ring 31. The sides 43 may be curves over at least 20%, 30% or 50% of the height of the support ring 31 only in directions running parallel to the plane in which the support ring 31 is situated.

One, two, three, four or more of the recesses 41 described above are provided on the support ring 31, wherein they may be arranged at regular intervals from one another along a circumference of the support ring 31, as is illustrated in the figures. However, this is not absolutely necessary.

The invention claimed is:

1. An extrusion blow-molded container, comprising:
a body and a neck, the neck having a pour opening and having an extrusion blow-molded hollow support ring, the hollow support ring comprising a hollow bulge and defining a plurality of recesses each extending from an outer edge of the support ring to the neck, the plurality of recesses each extending over an entire height of the support ring essentially in a longitudinal direction of an extent of the neck, and each of the plurality of recesses extending over an entire width of the support ring to stiffen the support ring, wherein the container is formed from plastic suitable for extrusion blow molding.

2. The container of claim 1, wherein the plurality of recesses extends over no more than 15% of a circumference of the support ring.

3. The container of claim 1, wherein sides of the plurality of recesses extending essentially in the longitudinal direction of the extent of the neck are essentially flat in at least partial areas of the sides.

4. The container of claim 3, wherein the support ring has a top side which extends essentially transversely to the direction of longitudinal extent of the neck and the pour opening, and has a bottom side opposite the top side, wherein the sides of the recess are fixedly connected to a bottom side and a top side, and wherein each transition from the bottom side to the sides of the plurality of recesses and each transition from the top side to the sides of the plurality of recesses essentially form sharp edged.

5. The container of claim 3, wherein the sides of the plurality of recesses form an angle with the neck of less than 60°.

6. The container of any one of claim 1, wherein the support ring has a maximum width between 2 and 5 millimeters.

7. The container of claim 1, wherein the plurality of recesses comprise four to eight recesses.

8. The container of claim 7, wherein the plurality of recesses extend no more than 40% of a circumference of the support ring.

9. The container of claim 7, wherein the shape and arrangement of the plurality of recesses allow unmolding of the container out of a two-part blow mold.

10. The container of claim 3, wherein the sides of the plurality of recesses form an angle with the neck greater than 60°.

11. The container of claim 3, wherein the sides of the plurality of recesses form an angle with the neck, the neck being an essentially round neck defining a tangential plane drawn on an imaginary line of intersection of each side with the neck, said angle being less than 60°.

12. The container of claim 7, wherein the plurality of recesses are arranged at substantially equal intervals along a circumference of the support ring.

13. The container of claim 1, wherein the container is formed from plastic selected from the group consisting of at least one of polyethylene, high-density polyethylene or polypropylene.

14. A blow-molded container, comprising:
a body and a neck, the neck having a pour opening and a blow-molded hollow support ring, the support ring having a plurality of recesses extending from an outer edge of the support ring to the neck, the plurality of recesses each extending over an entire height of the support ring essentially in a longitudinal direction of an extent of the neck, each of the plurality of recesses extending over an entire width of the support ring to stiffen the support ring, and each of the plurality of recesses extending over no more than 15% of a circumference of the support ring.

15. The container of claim 14, wherein sides of the plurality of recesses extending essentially in the longitudinal direction of the extent of the neck are essentially flat in at least partial areas of the sides.

16. The container of claim 15, wherein the support ring has a top side which extends essentially transversely to the direction of longitudinal extent of the neck and the pour opening, and has a bottom side opposite the top side, wherein the sides of the recess are fixedly connected to a bottom side and a top side, and wherein each transition from the bottom side to the sides of the plurality of recesses and each transition from the top side to the sides of the plurality of recesses essentially form sharp edged.

17. The container of claim 14, wherein the plurality of recesses comprise four to eight recesses.

18. The container of claim 15, wherein the sides of the plurality of recesses form an angle with the neck, the neck being an essentially round neck defining a tangential plane drawn on an imaginary line of intersection of each side with the neck, said angle being less than 60°.

19. The container of claim 14, wherein the plurality of recesses are arranged at substantially equal intervals along a circumference of the support ring.

20. A blow-molded container, comprising:
a body and a neck, the neck having a pour opening and a blow-molded hollow support ring, the support ring having a plurality of recesses extending from an outer edge of the support ring to the neck, the plurality of recesses each extending over an entire height of the support ring essentially in a longitudinal direction of an extent of the neck, and each of the plurality of recesses extending over an entire width of the support ring to stiffen the support ring, wherein the plurality of recesses comprise four to eight recesses and extend no more than 40% of a circumference of the support ring.

21. The container of claim 20, wherein the plurality of recesses extends over no more than 15% of a circumference of the support ring.

22. The container of claim 20, wherein sides of the plurality of recesses extending essentially in the longitudinal direction of the extent of the neck are essentially flat in at least partial areas of the sides.

23. The container of claim 22, wherein the support ring has a top side which extends essentially transversely to the direction of longitudinal extent of the neck and the pour opening, and has a bottom side opposite the top side, wherein the sides of the recess are fixedly connected to a bottom side and a top side, and wherein each transition from the bottom side to the sides of the plurality of recesses and each transition from the top side to the sides of the plurality of recesses essentially form sharp edged.

* * * * *